US 6,697,231 B1

(12) United States Patent
Kikuiri

(10) Patent No.: US 6,697,231 B1
(45) Date of Patent: Feb. 24, 2004

(54) THIN FILM MAGNETIC HEAD AND ROTARY HEAD ASSEMBLY USING THIN FILM MAGNETIC HEADS

(75) Inventor: Katsuya Kikuiri, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/535,307

(22) Filed: Mar. 24, 2000

(30) Foreign Application Priority Data

Mar. 26, 1999 (JP) ............................................ 11-083701

(51) Int. Cl.[7] .................. G11B 21/04; G11B 21/18; G11B 5/52; G11B 5/23; G11B 21/16; G11B 5/48
(52) U.S. Cl. .................. 360/271.5; 360/119; 360/241.1
(58) Field of Search .......................... 360/119, 121, 360/271.5, 271.1, 271, 270, 240, 281.4, 281.5, 291.4, 291.6, 241.1

(56) References Cited

U.S. PATENT DOCUMENTS

| 4,370,802 A | 2/1983 | Platter et al. ............ 29/603.14 |
| 4,388,661 A | 6/1983 | Sakurai ...................... 360/112 |
| 4,546,541 A | 10/1985 | Reid ....................... 29/603.14 |
| 4,571,651 A | 2/1986 | Reid et al. ................... 360/316 |
| 4,642,716 A | 2/1987 | Wakabayashi et al. ....... 360/129 |
| 5,648,886 A | * 7/1997 | Kobayashi et al. .......... 360/313 |
| 5,909,343 A | * 6/1999 | Kanno et al. ............. 360/271.5 |
| 6,172,857 B1 | * 1/2001 | Inaguma et al. ............ 360/271 |

FOREIGN PATENT DOCUMENTS

| JP | 1-182907 | 7/1989 |
| JP | 10-124819 | 5/1998 |
| JP | 10-283613 | 10/1998 |

OTHER PUBLICATIONS

Japanese Office Action, Apr. 2, 2002, Japan.

* cited by examiner

Primary Examiner—Julie Anne Watko
(74) Attorney, Agent, or Firm—Brinks Hofer Gilson & Lione

(57) ABSTRACT

A thin film magnetic head includes a head element portion stacked on a side surface of a substrate having two opposed planes, two opposed side surfaces intersecting the planes, and a tape slide surface provided at one end portion of the planes and the side surfaces. At least one of a magnetic gap Gb of an induction type magnetic head and a magneto-resistive effect element Ga of a magneto-resistive effect type magnetic head are exposed on the tape slide surface, and a bonding pad 3 is connected to the head element portion, wherein an angle made by one of the side surfaces on which the head element portion and the bonding pad are provided and one of the planes constitutes an azimuth angle.

4 Claims, 10 Drawing Sheets

THIN FILM MAGNETIC HEAD AND ROTARY HEAD ASSEMBLY USING THIN FILM MAGNETIC HEADS

BACKGROUND OF THE INVENTION

1. Field of the Invention

The present invention relates to a rotary head assembly for magnetic recording/playback and a method for manufacturing the same and, in particular, to a thin film magnetic head for use in a helical scan type magnetic recording/playback apparatus using a magnetic tape, a method for manufacturing the same, and a rotary head assembly using a thin film magnetic head.

2. Description of the Related Art

FIGS. 5A and 5B illustrate a conventional helical scan type magnetic recording/playback apparatus. FIG. 5A is a perspective view of a rotary drum, and FIG. 5B is a schematic diagram illustrating recording on a magnetic tape. FIGS. 6A and 6B are perspective views of magnetic heads for use in a conventional helical scan type magnetic recording/playback apparatus. FIG. 6A is a perspective view of a MIG head, and FIG. 6B is a perspective view of a laminate type head. FIGS. 7A and 7B are perspective views of conventional magnetic heads mounted to bases. FIG. 7A shows a single head consisting of a single MIG head, and FIG. 7B shows a combination head consisting of two MIG heads. FIGS. 8A and 8B illustrate a thin film magnetic head for use in a magnetic recording/playback apparatus such as a hard disk apparatus. FIG. 8A is a perspective view of a thin film magnetic head, and FIG. 8B is a main part plan view of FIG. 8A. FIGS. 9A, 9B and 9C illustrate a rotary head assembly when the thin film magnetic head of FIGS. 8A and 8B is applied to a helical scan type magnetic recording/playback apparatus. FIG. 9A is a perspective view of a thin film magnetic head mounted to a base, FIG. 9B is a side view of a thin film magnetic head mounted to a rotary drum, and FIG. 9C is a schematic diagram illustrating recording on a magnetic tape by a thin film magnetic head. FIGS. 10A and 10B are side views of the rotary head assembly mounted to a rotary drum. FIG. 10A is a side view when the mounting is effected with the base inclined, and FIG. 10B is a side view when the surface for mounting the thin film magnetic head to the base is inclined.

In a magnetic recording/playback apparatus in which a magnetic tape is used as the magnetic recording medium, such as VCR or a data recording/playback apparatus for a computer, a helical scan type recording/playback is performed. In the helical scan type recording/playback, a so-called azimuth recording/playback is conducted, in which the track of the magnetic gap of the magnetic head is inclined with respect to the magnetic tape running direction, and in which the magnetic gap of the magnetic head is inclined by a predetermined angle (azimuth angle) with respect to the width direction of the track.

Generally speaking, in a helical scan type magnetic recording/playback apparatus, a plurality of heads are used in order to achieve an improvement in recording density and data transfer rate. For example, as shown in FIG. 5A, two magnetic heads H1 and H2 are arranged at opposed positions in a rotary drum D. The magnetic heads H1 and H2 may consist of a single head in which play back is performed by a single playback head on a track on which recording has been effected with a single recording head, or a combination head in which two recording heads and two playback heads are used. In either case, a so-called guard bandless type recording is performed, in which when the rotary drum D is driven and one of the magnetic heads H1 and H2 performs recording on the magnetic tape Tp, the track on which recording is performed overlaps a part of the region of another track on which recording has been performed immediately before that by the other magnetic head. For example, as shown in FIG. 5B, after recording is performed on the track T1, recording is performed on the track T2, overlapping a part of the region at the upper end of the track T1.

In both the single head and the combination head, a double azimuth system is adopted, in which the azimuth angles θ1 and θ2 of the magnetic gaps G1 and G2 of the magnetic heads H1 and H2 are inclined in directions opposite to each other. This is for the purpose of removing crosstalk with the adjacent track T2 by utilizing the azimuth loss based on the difference between the azimuth angle θ1 of the track T1 and the azimuth angle θ2 of the track T2. Although in the track T1 on which playback is performed by the magnetic head H1, there is a region where it overlaps another adjacent track T2 on which recording has been performed by the magnetic head H2. Further, at the time of playback on the track T2 by the magnetic head H2 also, the crosstalk with the adjacent track T1 is similarly removed due to the azimuth loss.

As a magnetic head used in a helical scan type magnetic recording/playback apparatus, there has been conventionally used a MIG (metal-in-gap) head as shown in FIG. 6A or a laminate type head as shown in FIG. 6B. In the MIG head shown in FIG. 6A, two half bodies Hm1 and Hm2, each of which is composed of a core 51 formed of magnetic material such as ferrite, a thin film 52 provided on the abutting surface of the core 51 and consisting of a metal magnetic material, and a coil 53 wound around the body of the core 51, abut each other. A magnetic gap Gm is formed on the surface on the thin film 52 is provided through the intermediation of a non-magnetic material such as glass. The laminate type head shown in FIG. 6B comprises two half bodies Hp1 and Hp2, each of which is composed of two substrates 54 formed of a non-magnetic material such as crystallized glass, a laminate film 55 provided between the two substrates 54 and consisting of a plurality of layers of a magnetic material and a non-magnetic material, and a coil 53 wound around the body portion of each of them, abut each other. A magnetic gap Gp is formed at the abutting surfaces through the intermediation of a non-magnetic material such as glass.

In the MIG head shown in FIG. 6A, the abutting surfaces of the half bodies Hm1 and Hm2 are machined, and the width of the magnetic gap Gm is made a desired minute width, making it the recording/playback track width. The half bodies Hm1 and Hm2 are caused to abut each other after machining the abutting surfaces inclined in the track width direction, and an azimuth angle θm is provided in the magnetic gap Gm. Further, in the laminate type head shown in FIG. 6B, the track width is determined by the thickness of the laminate film 55, so that there is no need to perform the machining process for determining the track width as in the MIG head Hm. The half bodies Hp1 and Hp2 are caused to abut each other after grinding the abutting surfaces inclined with respect to the track width direction, and an azimuth angle θp is provided in the magnetic gap Gp. In both the MIG head and the laminate type head, in the case of the double azimuth system, two magnetic heads of different and opposite azimuth angles θm and θp are prepared.

As shown in FIGS. 7A and 7B, one or two magnetic heads H1, H2, consisting of MIG heads, laminate type heads, etc., are mounted to the end portion of a base 56 on which a circuit board (not shown) is provided, and the end portion of the coil 53 and the circuit board (not shown) are connected. FIG. 7A shows a single head consisting of a single MIG head, and FIG. 7B shows a combination head consisting of two MIG heads arranged side by side. The magnetic heads H1 and H2 are mounted to the base 56 to form a rotary head assembly, and the coil 53 is connected through the circuit board (not shown) to an external processing circuit (not shown) for controlling the transmission and reception of signals. As shown in FIG. 5A, the rotary head assembly is mounted to opposed positions of the rotary drum D such that the magnetic gaps G1 and G2 are exposed on the outer peripheral surface of the rotary drum D.

Recently, in VCR and data recording/playback apparatus, to realize a high density in recording on a magnetic recording medium, a reduction in track width and an increase in frequency is effected. To achieve a reduction in track width, it is necessary to reduce the width of the magnetic gap. However, in the above-described MIG head, in which the magnetic gap Gm is formed by grinding, it is necessary to achieve a reduction in size, but a reduction in track width cannot be realized. To achieve a reduction in track width, a high grinding accuracy is required for the abutting surfaces for forming the magnetic gap Gm. However, an improvement in the machining accuracy in the minute magnetic gap Gm is hard to achieve. Further, to realize an increase in frequency, it is necessary to reduce the inductance. However, in the MIG head and the laminate type head, it is impossible to achieve a reduction in inductance. Further, in the MIG head and the laminate type head, the playback output cannot be enlarged when an increase in recording density is effected.

In a magnetic recording/playback apparatus, such as a hard disk apparatus, various types of thin film magnetic head are already used. Examples of the generally used thin film magnetic head include an induction type magnetic head mainly intended for recording (inductive head) and a magneto-resistive type magnetic head (MR head) for playback. A composite type thin film magnetic head formed by stacking the heads together is widely used. As shown in FIGS. 8A and 8B, a thin film magnetic head 61 used in a magnetic recording/playback apparatus, such as a hard disk apparatus, is formed by providing, on the side surface of a slider 62 obtained by cutting a wafer consisting of a ceramic material such as alumina titan carbide ($Al_2O_3$/TiC), a head element portion 63 composed of an MR head 63a and an inductive head 63b stacked thereon. Bonding pads 64 are connected to the MR head 63a and the inductive head 63b. The MR head 63a comprises an MR layer 63a1, an upper gap layer 63a2 provided over it, and a lower gap layer 63a3 provided under the slider 62 side. A magneto-resistive effect element (MR element) Ga is set by the thickness of the sum total of these three layers. The inductive head 63b comprises an upper core layer 63b1 and a lower core layer 63b2, a recording magnetic gap Gb is determined by the thickness of a non-magnetic material layer 63b3 provided therebetween. Further, due to the laminate structure, the MR element Ga and the magnetic gap Gb exposed on the upper surface of the slider 62 are parallel to each other. Further, the four bonding pads 64 provided on the side surface of the slider 62 are respectively connected to coils (not shown) of the MR layer 63a1 of the MR head 63a and the inductive head 63b by four lead-out lines (not shown).

This thin film magnetic head can be mass-produced at one time by a thin film formation process. As such, the thin film magnetic head obtained is advantageously of small size and of high recording/playback accuracy. Further, the thin film magnetic head can be easily adapted to a reduction in size, such as a reduction in gap width for a reduction in track width, and it is possible to realize an increase in recording density. Further, regarding the MR head in particular, it is possible to directly respond to a signal magnetic field independently of the relative speed of the magnetic recording medium, making it possible to effect high playback output. Moreover, since the inductance is far lower as compared with that of the MIG head and the laminate type head, it is possible to cope with an increase in frequency. In this way, the problems in the conventional magnetic head can be eliminated, so that there has been a demand for mounting the thin film magnetic recording head on a rotary head and apply it to a helical scan type magnetic recording/playback apparatus using a magnetic tape.

To apply the thin film magnetic head to a helical scan type magnetic recording/playback apparatus using a magnetic tape, there is prepared a thin film magnetic head 61 as shown in FIG. 9A, which is provided with an MR element Ga and a magnetic gap Gb on the side, and it is mounted to a base 65. A circuit board 66, such as a flexible printed circuit board connected to an external processing circuit, is provided in the same plane, and the terminal portions 66a thereof and the bonding pads 64 are connected by balls 67 formed by ball bonding. The rotary head assembly thus formed is mounted to opposed positions of the rotary drum D such that, as shown in FIG. 9B, the MR element Ga and the magnetic gap Gb are directed to the outer peripheral surface of the rotary drum D.

When performing recording/playback on a magnetic tape using this thin film magnetic head 61, azimuth recording/playback is indispensable, so that it is necessary to incline the MR element Ga and the magnetic gap Gb by a predetermined azimuth angle with respect to the track width direction. However, when the thin film magnetic head used in the above-described hard disk apparatus or the like is applied as it is, the MR element Ga and the magnetic gap Gb are perpendicular to the mounting surface of the base 65, as shown in FIG. 9B. When performing recording/playback by the thin film magnetic head 61 as shown in FIG. 9C, it is perpendicular to the track T, and the azimuth angle is zero. This is due to the fact that the thin film magnetic head 61 is obtained by a production process in which layers are sequentially stacked on the upper surface of a wafer, so that it is difficult to produce the head correctly inclining the MR element Ga and the magnetic gap Gb by a desired azimuth angle on the end surface of the slider 62, which is the upper surface of the wafer.

When providing an azimuth angle in the magnetic gap of a thin film magnetic head, it might be possible, as shown in FIG. 10A, to mount the base 65 mounted on the thin film magnetic head 61 to the rotary drum D in a state inclined by a desired azimuth angle by an appropriate means. Or, as shown in FIG. 10B, it might be possible to perform grinding on the surface of the base 65 mounted to the rotary drum D (the surface opposite to the surface on which the thin film magnetic head 61 is mounted) and incline the surface by a desired azimuth angle.

In the means shown in FIG. 10A, it is necessary for the azimuth angle of the MR element Ga and the magnetic gap Gb of the individual thin film magnetic head 61 and the mounting position with respect to the rotary drum D to be correct. Furthermore, in the means for mounting the base 65 in an inclined state, it is very difficult to reproduce with high accuracy the inclination angle and the mounting positions of the MR element Ga and the magnetic gap Gb. Additionally, in the means for forming inclination by grinding shown in FIG. 10B, the number of procedures increases, which leads to complexity, and it is very difficult to reproduce the inclination angle with high accuracy.

SUMMARY OF THE INVENTION

Accordingly, it is an object of the present invention to provide a thin film magnetic head for use in a helical scan type magnetic recording/playback apparatus which includes an MR head and an inductive head, in which an azimuth angle is provided in the magnetic gap, and which uses a magnetic tape, and a method for producing the same, and a rotary head assembly using a thin film magnetic head.

To achieve the above object, there is provided, in accordance with the present invention, a thin film magnetic head comprising a head element portion stacked on a side surface of a substrate having two opposed planes, two opposed side surfaces intersecting the planes, and a tape slide surface provided at one end portion of the planes and the side surfaces, at least one of a magnetic gap of an induction type magnetic head and a magneto-resistive effect element of a magneto-resistive effect type magnetic head being exposed on the tape slide surface, and a bonding pad connected to the head element portion, wherein an angle made by one of the side surfaces on which the head element portion and the bonding pad are provided and one of the planes constitutes an azimuth angle.

Further, in the thin film magnetic head of the present invention, the two planes and the two side surfaces of the substrate are respectively parallel to each other.

Further, in the thin film magnetic head of the present invention, there is provided a protecting plate attached so as to cover the head element portion to protect the head element portion.

In accordance with the present invention, there is further provided a thin film magnetic head producing method comprising the steps of: stacking on a planar wafer at least one of an induction type magnetic head and a magneto-resistive effect type magnetic head to form a plurality of head element portions, forming a plurality of sets of bonding pads connected to the head element portions, cutting the wafer with magnetic gaps of the head element portions being exposed on a same end surface to form a bar on which a plurality of said head element portions and said bonding pads are arranged side by side, attaching a protective member consisting of a bar-like non-magnetic material so as to stride over and cover the plurality of head element portions of the bar, and integrally cutting the bar and the protective member for each head element portion and each bonding pad to form a substrate and a protective plate with a set of said head element portion existing therebetween. An angle made by the cut surface and the surface on which the head element portion is provided constitutes a desired azimuth angle.

In accordance with the present invention, there is further provided a rotary head assembly, wherein one of the planes of the thin film magnetic head is placed so as to be in contact with the upper surface of a base consisting of a plate-like member, and an azimuth angle is determined by one of the side surfaces on which the head element portion and the bonding pad are provided and the upper surface of the base.

Further, in the rotary head assembly of the present invention, the angle formed by one of the side surfaces on which the head element portion and the bonding pad are provided and the base on the side where the head element portion and the bonding pad are provided is an obtuse angle.

Further, in the rotary head assembly of the present invention, two heads are arranged side by side, such that one of the planes of the thin film magnetic head is in contact with the upper surface of the base, where the base consists of a plate-like member. The azimuth angle of each of the two thin film magnetic heads is determined by the angle made by one of the side surfaces on which the head element portion and the bonding pad are provided and the upper surface of the base.

Further, the rotary head assembly of the present invention is placed on the base such that one of the side surfaces of one of the thin film magnetic heads on which the head element portion and the bonding pad are provided is not opposed to the side surface of the other thin film magnetic head.

Further, the rotary head assembly of the present invention is placed on the base such that one of the side surfaces of the one of the thin film magnetic heads on which the head element portion and the bonding pad are provided is opposed to one of the side surfaces of the other thin film magnetic head on which the head element portion and the bonding pad are provided. The angle that is formed by one of the side surfaces on which the head element portion and the bonding pad are provided and the base on the side where the head element portion and the bonding pad are provided is an obtuse angle.

DETAILED DESCRIPTION OF THE PREFERRED EMBODIMENTS

Figure 1A:
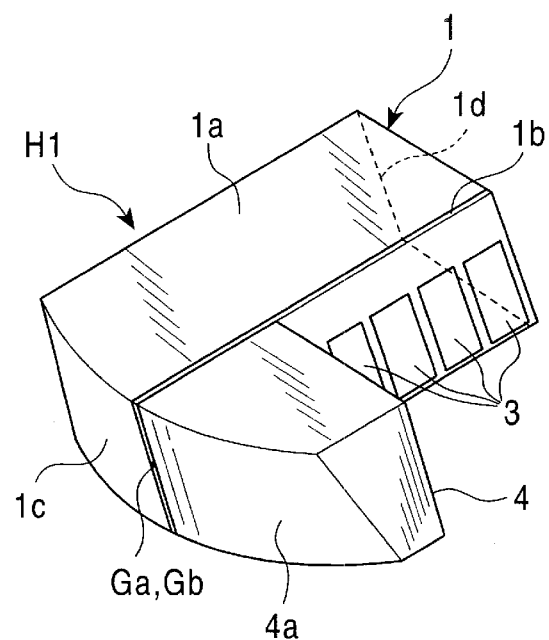
FIGS. 1A, 1B and 1C are schematic diagrams illustrating a thin film magnetic head according to the present invention.
Figure 1B:
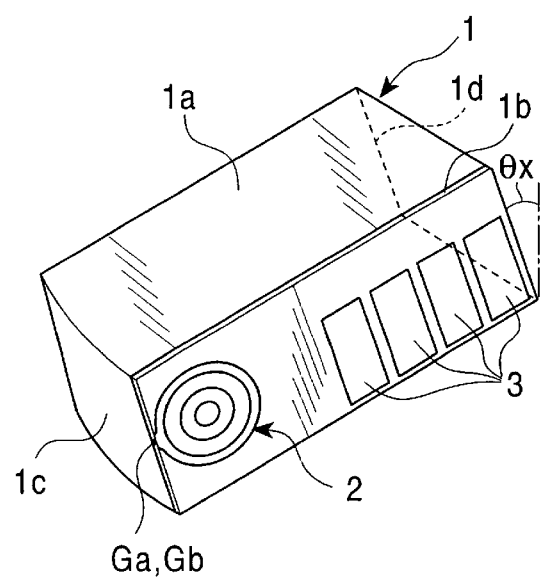
Figure 1C:
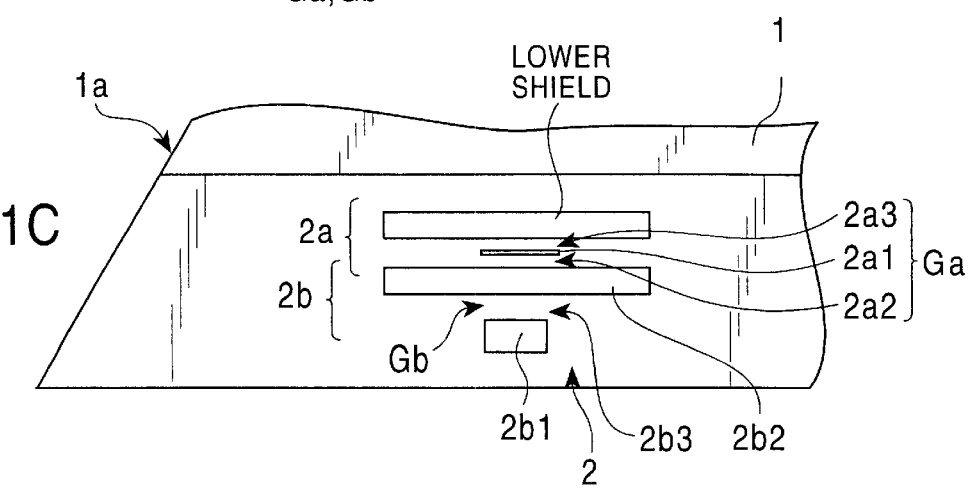
Figure 2A:
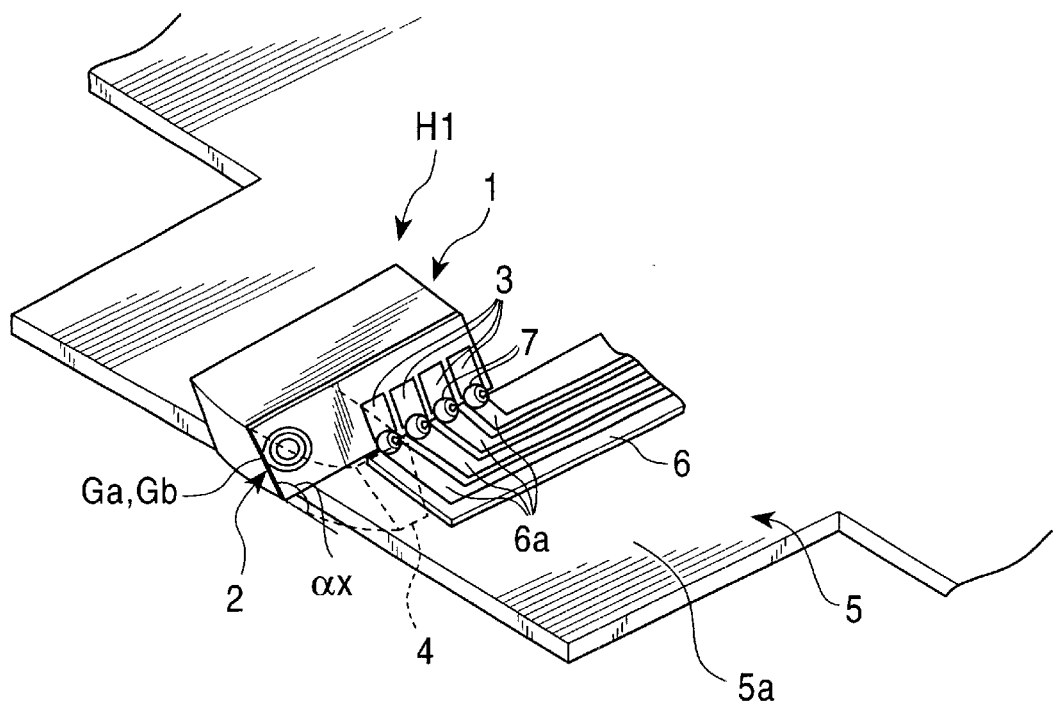
FIGS. 2A and 2B are schematic diagrams illustrating the mounting of a rotary head assembly using a thin film magnetic head according to the present invention.
Figure 2B:
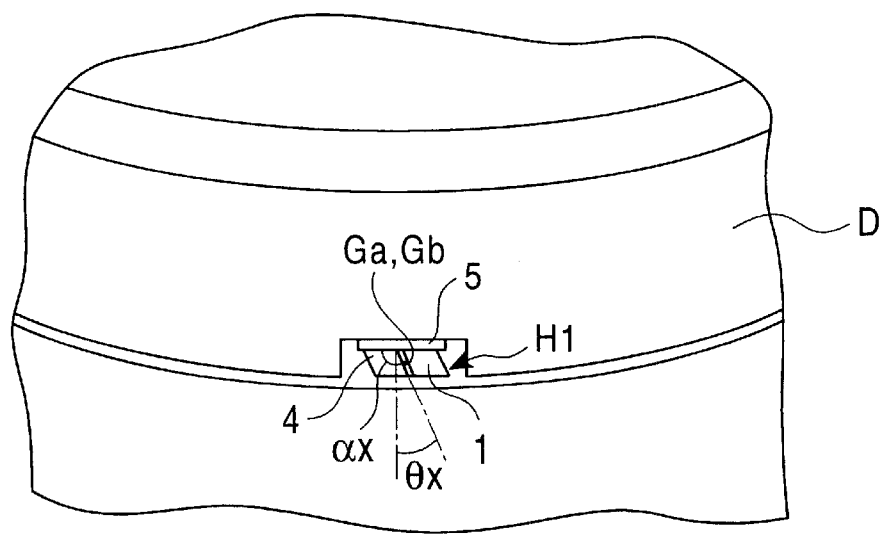
Figure 3A:
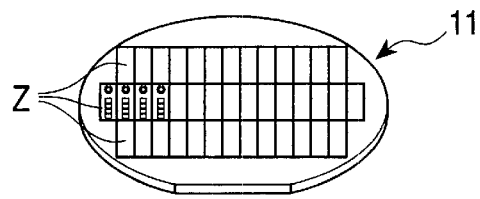
FIGS. 3A, 3B, 3C and 3D are schematic diagrams illustrating the process for manufacturing the thin film magnetic head of the present invention.

Embodiments of the thin film magnetic head of the present invention, the method of producing the same, and the rotary head assembly using the thin film magnetic head will be described. FIGS. 1A, 1B and 1C are schematic diagrams illustrating a thin film magnetic head according to the present invention. FIG. 1A is a perspective view of a thin film magnetic head, FIG. 1B is a perspective view of a main part of FIG. 1A, and FIG. 1C is a plan view of a main part of FIG. 1A. FIGS. 2A and 2B are diagrams illustrating the mounting of a rotary head assembly using the thin film magnetic head of the present invention. FIG. 2A is a perspective view of a rotary head assembly according to the present invention consisting of a thin film magnetic head mounted to a base, and FIG. 2B is a side view of the rotary head assembly of the present invention mounted to a rotary drum. FIGS. 3A, 3B, 3C and 3D are schematic diagrams illustrating a process for producing the thin film magnetic head of the present invention. FIGS. 4A, 4B and 4C are perspective views of a double azimuth type rotary head assembly formed by using the thin film magnetic head of the present invention. FIG. 4A shows a combination in which the angle made by the side surface of one of the thin film magnetic heads on which the head element portion is provided and the circuit board is less than 90 degrees. FIG. 4B shows a combination in which the angles made by the side surfaces of the two thin film magnetic heads on which a head element portion is provided and the circuit board are more than 90 degrees. In the embodiment illustrated in FIG. 4B, the side surfaces are not opposed to each other. FIG. 4C shows a combination in which the angles made by the side surfaces of the two thin film magnetic heads on which a head element portion is provided are more than 90 degrees, and the side surfaces are opposed to each other.

As shown in FIGS. 1A and 1B, the thin film magnetic head comprises a substrate 1, which is formed of a nonmagnetic material, such as alumina titan carbide ($Al_2O_3$/TiC), and which comprises two opposed parallel planes 1a. Two opposed parallel side surfaces 1b which intersect the planes 1a. A tape slide surface 1c, which is provided at the end of the planes 1a and the side surfaces 1b, is formed as a gently cylindrical surface. An end surface 1d is provided at a position opposed to the tape slide surface 1c. Accordingly, in the illustrated embodiment, the substrate constitutes a prism whose section perpendicular to the longitudinal direction is a parallelogram. Further, the difference between the angle made by the planes 1a and the side surfaces 1b of the substrate 1 (that is, the internal angle of the sectional parallelogram) and the vertical direction constitutes an azimuth angle θx.

Further, as shown in FIGS. 1B and 1C, the head element portion 2, formed by a thin film formation method, comprises an MR head 2a for playback provided on the side surface 1b of the substrate and an inductive head 2b for recording stackedon the MR head 2a. The MR head 2a comprises an MR layer 2a1, an upper gap layer 2a2 provided over it, and a lower gap layer 2a3 provided on the lower layer on the substrate 1 side, the MR element Ga being set by the total film thickness of these three layers. Further, the inductive head 2b comprises an upper core layer 2b1, a lower core layer 2b2, and a coil (not shown), and the recording magnetic gap Gb is set by the thickness of a non-magnetic material layer 2b3 provided therebetween. Further, the track width is set by the longitudinal length of the MR element Ga and the magnetic gap Gb. Further, the MR element Ga and the magnetic gap Gb are exposed at a planar position, which is the same as the tape slide surface 1c of the substrate 1. While in FIG. 1C the MR element Ga of the MR head 2a and the magnetic gap Gb of the inductive head 2b are depicted equally for the sake of convenience, the thickness of the MR layer 2a1 is actually very small, which means the MR element Ga is thinner than the magnetic gap Gb.

Further, the four bonding pads 3 provided on the side surface 1b side of the substrate 1 are connected by four lead-out lines (not shown) to the MR layer 2a1 of the MR head 2a and a coil (not shown) of the inductive head 2b.

A protective plate 4 consisting of a non-magnetic material, such as alumina titan carbide, is provided for the purpose of preventing the head element portion 2, whose thickness is very small (several tens of μm), from being excessively worn or damaged by the sliding of the magnetic tape. As shown in FIG. 1A, the protective plate 4 covers the head element portion 2, and is attached by an appropriate means, such as a resin adhesive or glass fusion, such that the four bonding pads 3 are exposed. Further, the tape slide surface 4a is formed as a cylindrical surface smoothly connected to the tape slide surface 1c of the substrate 1 and the surface where the MR element Ga and the magnetic gap Gb are exposed. Accordingly, the two planes 4b of the protective plate 4 are flush with the planes 1a of the substrate 1. In this way, a substantially L-shaped thin film magnetic head H1 is formed.

Referring to FIG. 2A, the thin film magnetic head H1, constructed as described above, is attached to a base to form a rotary head assembly. A base 5, which consists of a plate member, is substantially square, and, as shown in FIG. 2A, the thin film magnetic head H1 is arranged on the head mounting surface 5a, and firmly attached thereto by an appropriate means, such as adhesive or screws. In FIG. 2A, the protective plate 4 is indicated by dotted lines. Further, a circuit board 6, such as a flexible printed circuit board (FPC) consisting of an insulating material with wiring, is arranged on the head mounting surface 5a of the base 5 on which the thin film magnetic head H1 is arranged, and four terminal portions 6a are close to the four bonding pads 3 of the thin film magnetic head H1. The mounting angle αx made by the side surface 1b of the thin film magnetic head H1 on which the four bonding pads 3 are provided and the circuit board 6 is an obtuse angle (an angle larger than 90 degrees). The four bonding pads 3 and the four terminal portions 6a are connected by balls 7 consisting of a conductive material formed by a ball bonding method.

As shown in FIG. 2B, a rotary head assembly, which includes the thin film magnetic head H1 is arranged on the base 5 shown in FIG. 2A, facing the head mounting surface 5a, of the base 5 is attached to the rotary drum D. The MR element Ga and the magnetic gap Gb of the thin film magnetic head H1 are mounted so as to be directed to the outer peripheral surface of the rotary drum D. In accordance with the invention, the manner in which the thin film magnetic head H1 is mounted to the base 5 and arranged on the rotary head determines, the azimuth angle θx of the MR element Ga and the magnetic gap Gb.

The process for producing the thin film magnetic head of the present invention will now be described. First, as shown in FIG. 3A, on a wafer 11 consisting of a non-magnetic material, such as alumina titanium carbide, a plurality of sets of thin film elements Z are formed in a matrix-like form by thin film formation process such as plating or photolithography. Each set includes a head element portion 2, lead-out lines (not shown), four bonding pads 3, and other elements (not shown).

Figure 3B:
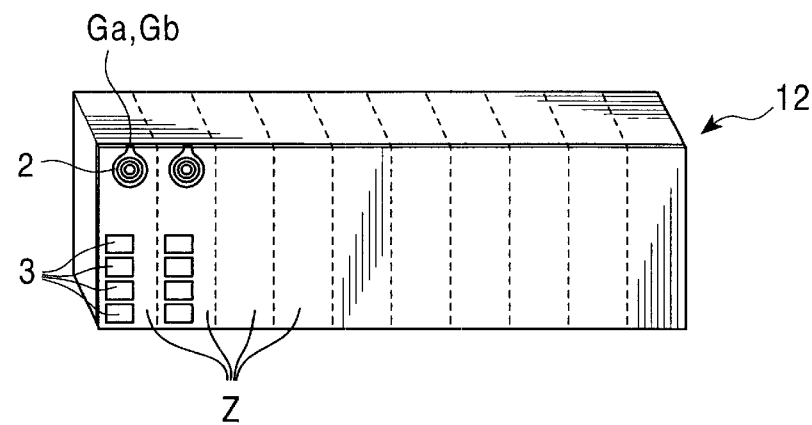
Figure 4A:
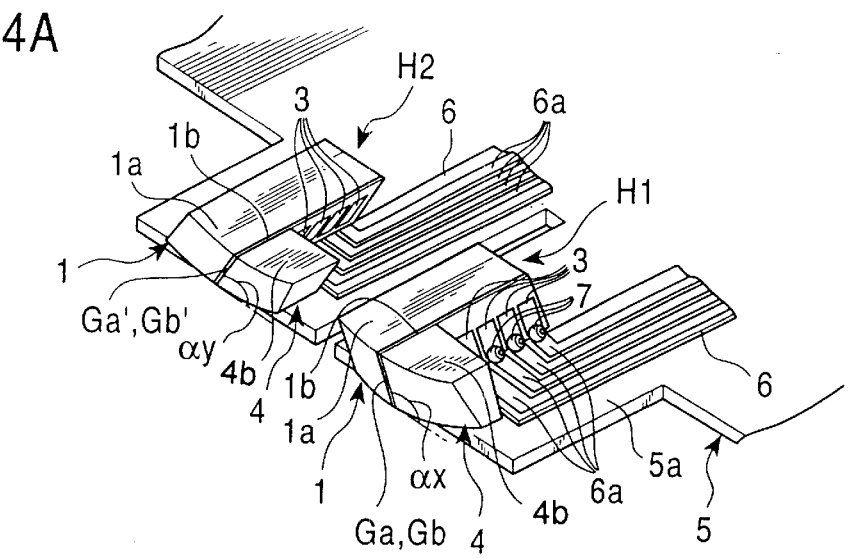
FIGS. 4A, 4B and 4C are perspective views of a double azimuth type rotary head assembly formed by using the thin film magnetic head of the present invention.
Figure 4B:
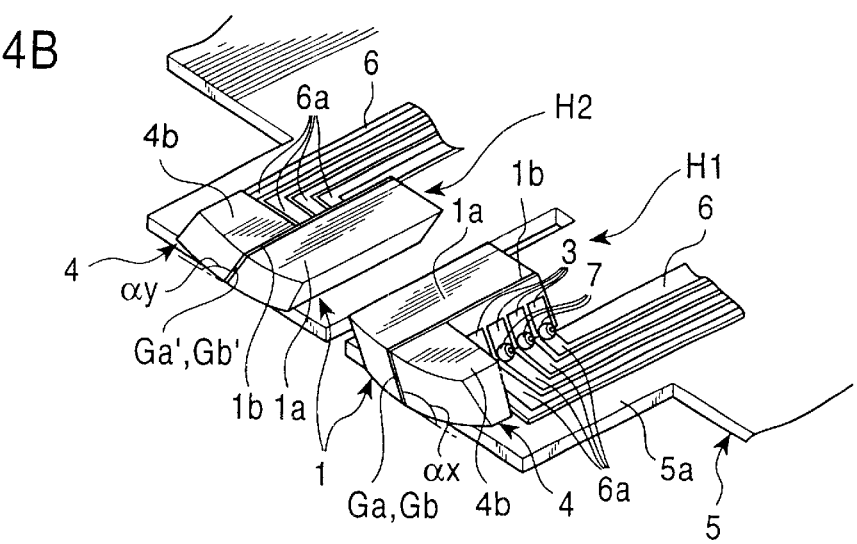
Figure 4C:
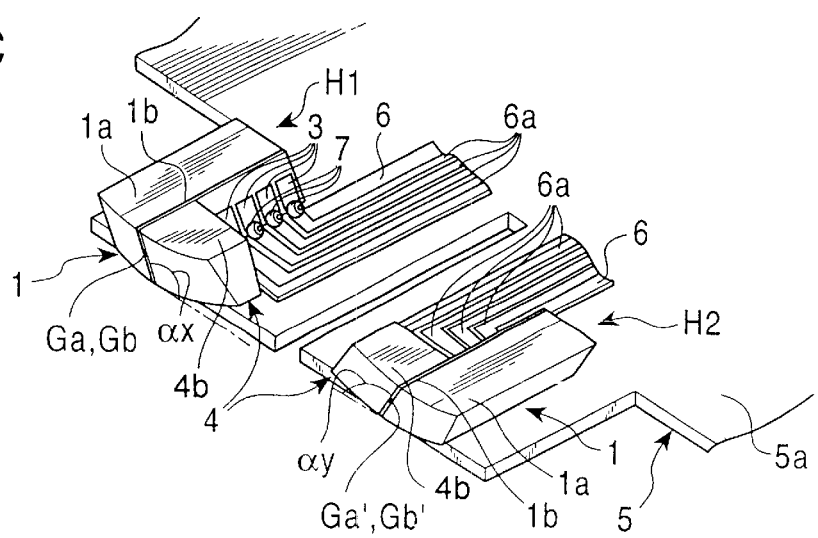
Figure 5A:
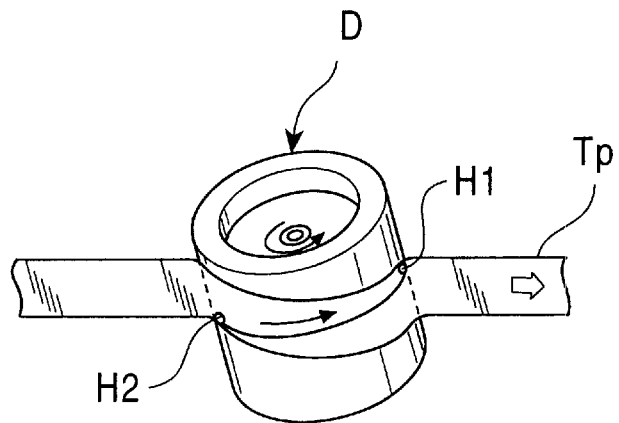
FIGS. 5A and 5B are schematic diagrams illustrating a conventional helical scan type magnetic recording/playback apparatus.
Figure 5B:
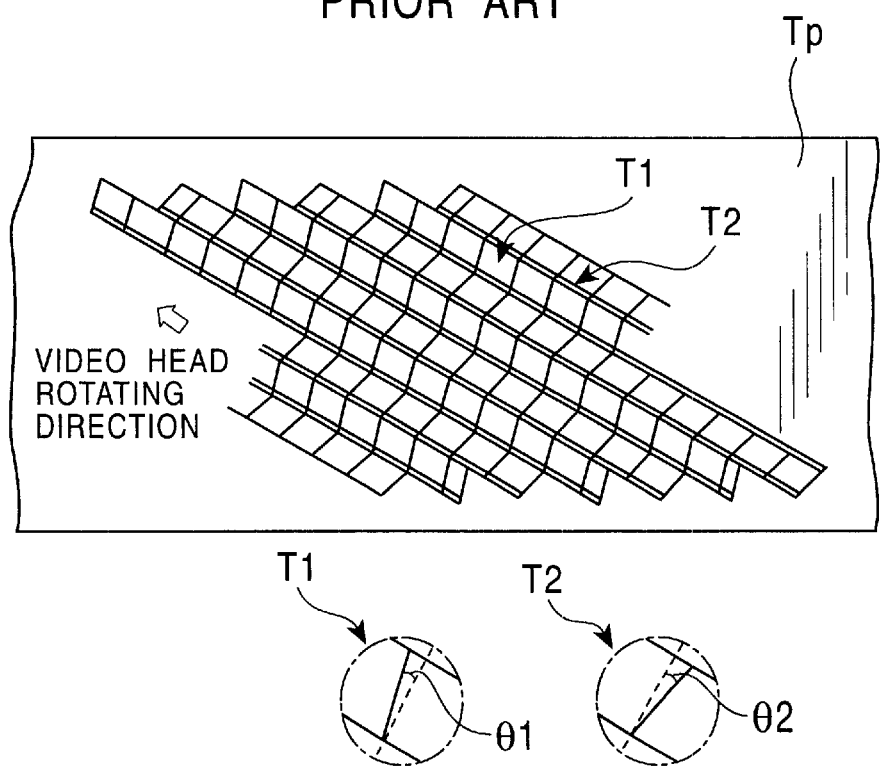
Figure 6A:
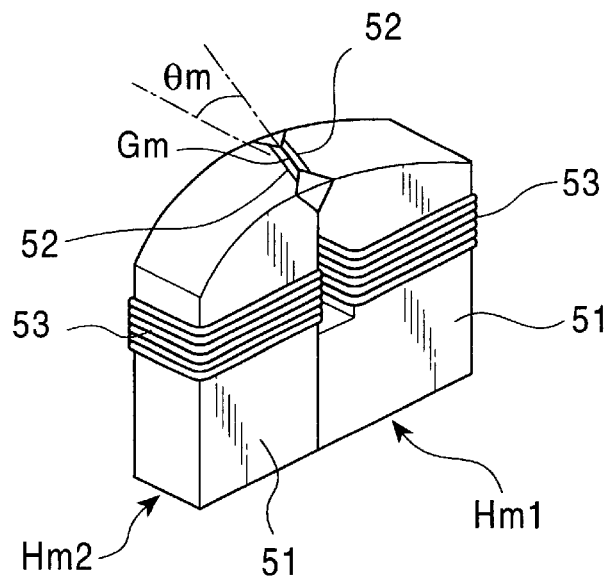
FIGS. 6A and 6B are perspective views of a magnetic head used in the conventional helical scan type magnetic recording/playback apparatus.
Figure 6B:
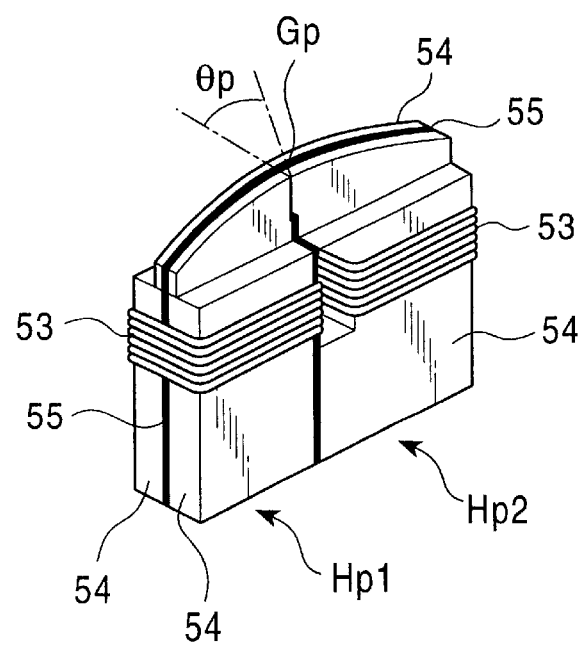
Figure 7A:
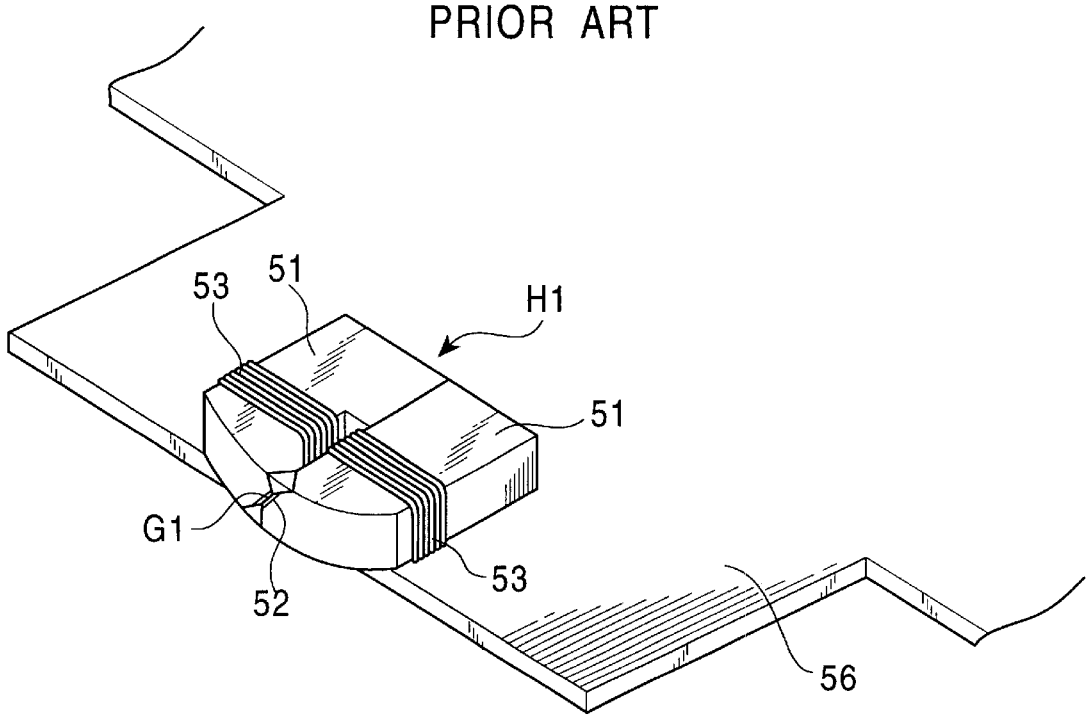
FIGS. 7A and 7B are perspective views of a conventional magnetic head mounted to a base.
Figure 7B:
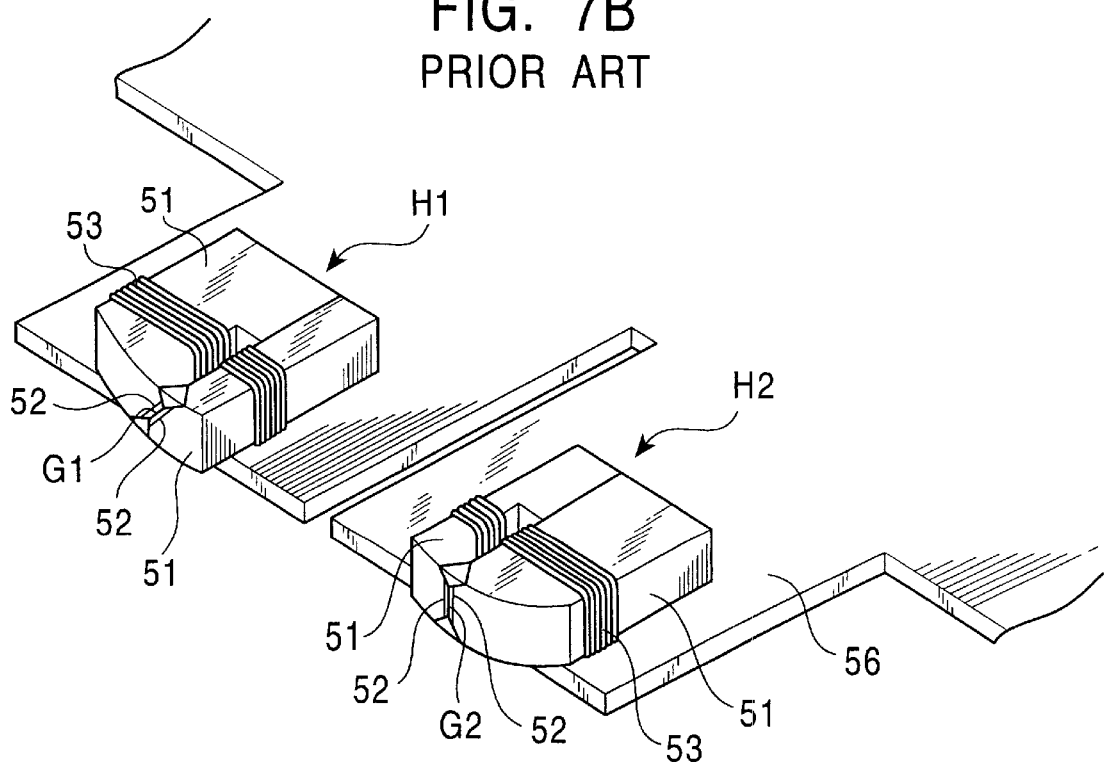
Figure 8A:
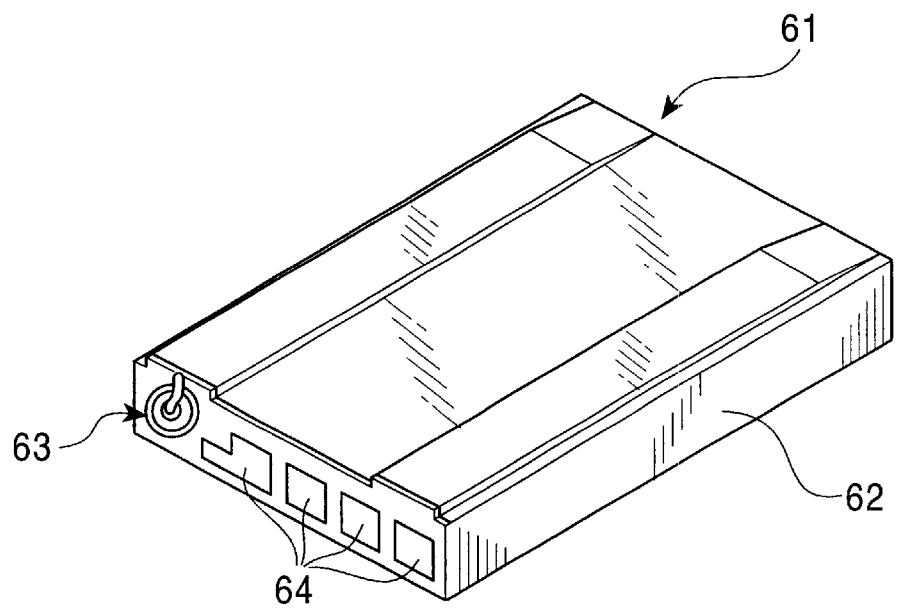
FIGS. 8A and 8B are schematic diagrams illustrating a thin film magnetic head used in a magnetic recording/playback apparatus such as a hard disk apparatus.
Figure 8B:
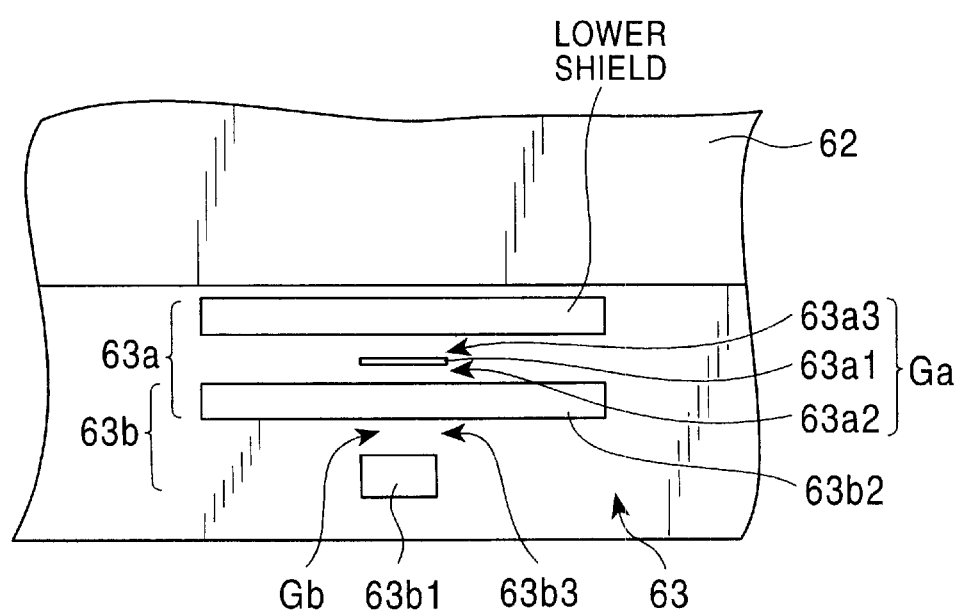
Figure 9A:
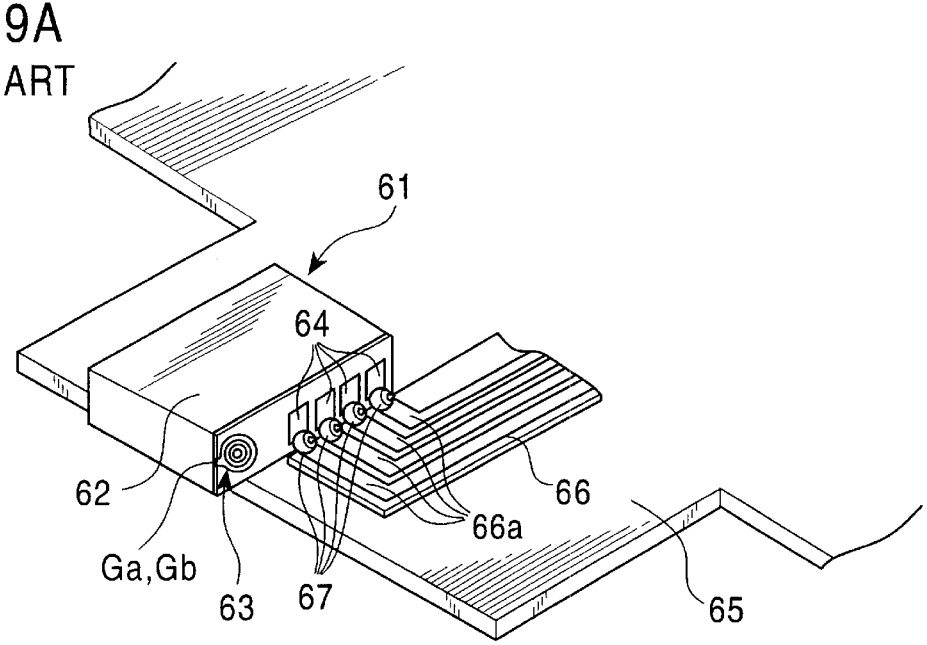
FIGS. 9A, 9B and 9C are schematic diagrams illustrating a rotary head assembly in the case in which the thin film magnetic head of FIG. 8 is applied to a helical scan type magnetic recording/playback apparatus.
Figure 9B:
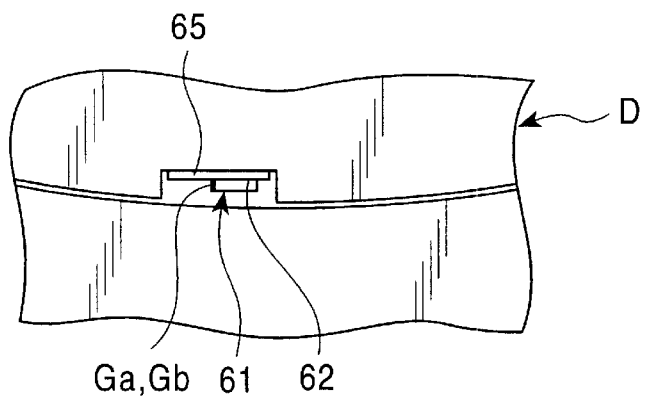
Figure 9C:
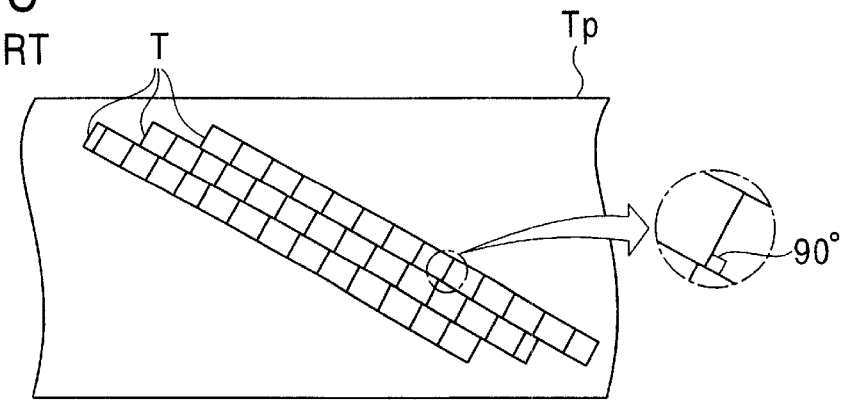
Figure 10A:
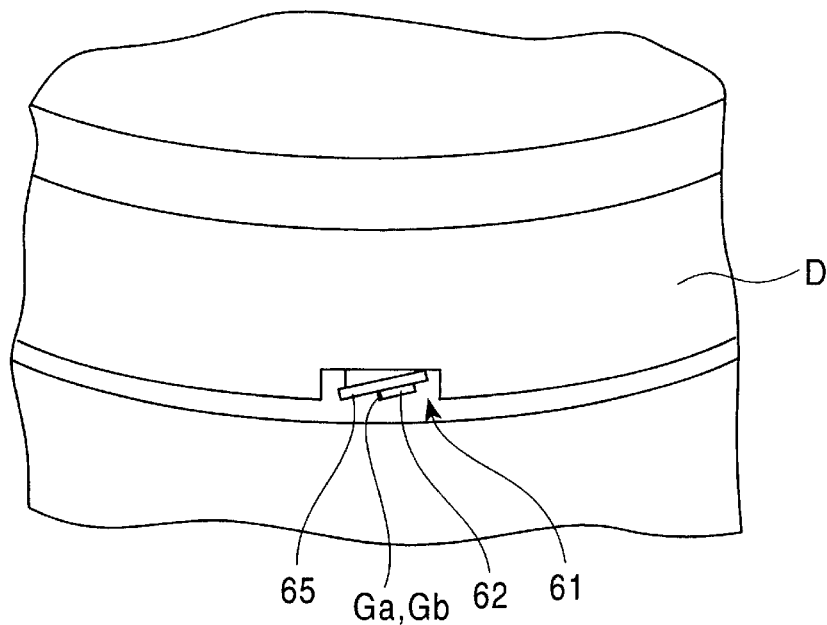
FIGS. 10A and 10B are side views of the rotary head assembly of FIG. 8 mounted to a rotary drum.
Figure 10B:
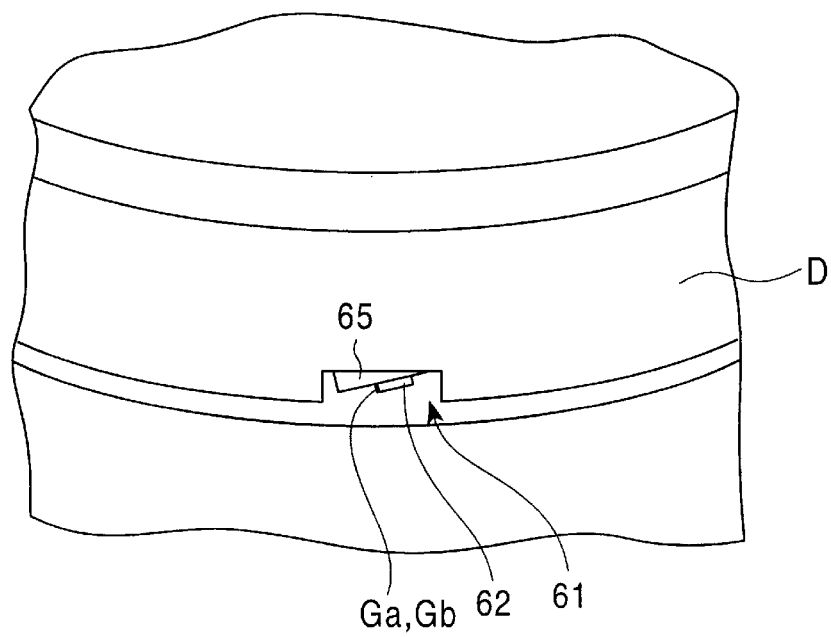

Next, as shown in FIG. 3B, the wafer 11 is cut to form a bar 12 such that the surface of the head element portions 2, on which the MR element Ga and the magnetic gap Gb are provided, are exposed in parallel. In the drawing, the dotted lines represent the boundaries between the thin film element units Z.

Figure 3C:
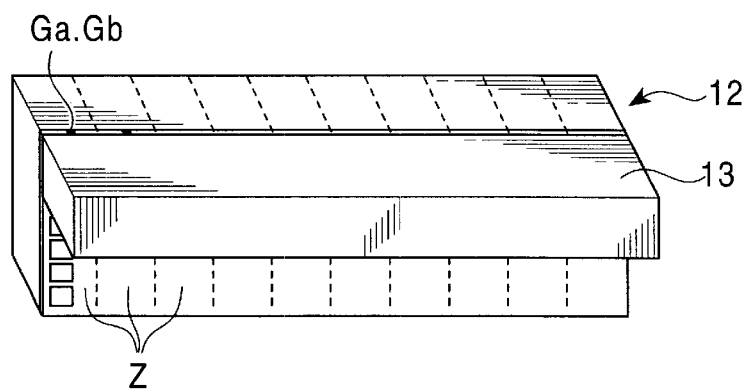

Next, as shown in FIG. 3C, a prism-like protective member 13 consisting of a non-magnetic material such as alumina titanium carbide is attached by an appropriate means such as resin adhesive or glass fusion such that it covers the plurality of head element portions 2, with the four bonding pads 3 being exposed.

Figure 3D:
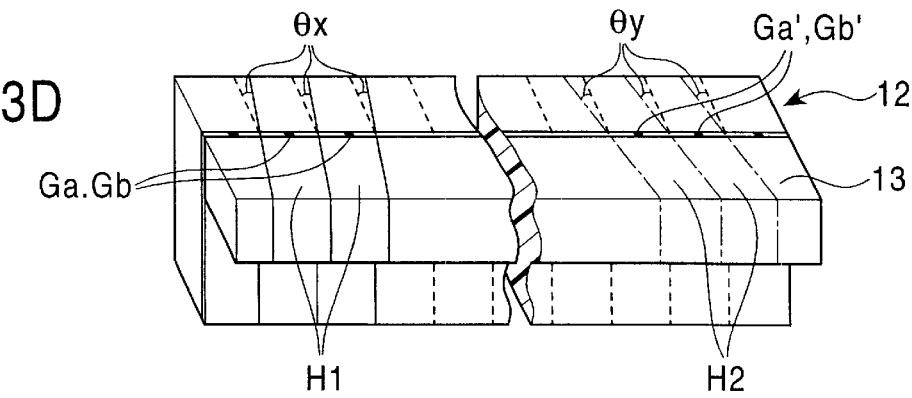

Next, as shown in FIG. 3D, the bar 12 and the protective member 13 are cut into thin film elements Z. The cutting is performed not along the boundaries between the thin film elements Z (indicated by the dotted lines), but along the solid lines in the drawing, which are inclined with respect to the boundaries by a predetermined angle (azimuth angle θx). The cutting surface constitutes the planes 1a (shown in FIGS. 1A, 1B, and 1C) and 4b (shown in FIGS. 4A, 4B, and 4C) of each substrate 1 and protective plate 4, respectively. The surface of the substrate 1 on which the thin film element Z is provided constitutes the side surface 1b (shown in FIG. 1). In this way, solely by cutting the bar 12, the azimuth angle θx of the MR element Ga and the magnetic gap Gb is determined with high accuracy. As needed, it is possible to polish the planes 1a and the side surfaces 1b opposite to the surface on which the head element portion 2 and the bonding pads 3 are provided. And, by the polishing and grinding processes, it is possible to obtain the thin film magnetic head H1 as shown in FIG. 1A having cylindrically smooth tape slide surfaces 1c and 4a.

In the process shown in FIG. 3B, the portions of the wafer 11 in which the thin film elements Z are not formed are left at the ends of the bar 12. Accordingly, in the cutting process shown in FIG. 3C, it is possible to avoid throwing away the two thin film elements Z at the ends and to use the m as a thin film magnetic head H1.

Next, the rotary head assembly is produced. Referring back to FIG. 2A, thin film magnetic head is firmly attached to the head mounting surface 5a where the circuit board 6 is arranged on the base 5 by an appropriate means such as adhesive or screws. The attachment is made such that the four bonding pads 3 are brought close to the four terminal portions 6a (See FIG. 2A). At this time, the mounting is carried out such that the angle (mounting angle) αx formed by the side surface 1b of the thin film magnetic head H1 where the thin film element Z (head element portion 2, bonding pads 3) is provided and the circuit board 6 is an obtuse angle (an angle larger than 90 degrees). That is, the arrangement is effected such that the bonding pads 3 can be seen from above the base 5. Next, the forward end portion of a capillary (not shown) for ball bonding is inserted between the bonding pads 3 and the terminal portions 6a, and ultrasonic junction of the balls 7 with the bonding pads 3 and the terminal portions 6a ismade, thereby completing the connection.

As shown in FIG. 2B, the surface of the base 5 opposed to the head mounting surface 5a, on which the thin film magnetic head H1 is arranged, is mounted to the lower surface of the rotary drum D, and the magnetic gaps Ga and Gb are directed to the outer peripheral surface of the rotary drum D. In contrast to the prior art, in the present invention, there is no need to incline the base during mounting. Also, the thin film magnetic head H1 can be mounted flush since the magnetic head H1 is already provided with an azimuth angle θx. In this way, the thin film magnetic head H1 attached to the rotary drum D can be applied to a helical scan type magnetic recording/playback apparatus using a magnetic tape, making it possible to conduct azimuth recording/playback.

While in the above-described embodiment the thin film magnetic head H1 comprises an MR head 2a for playback and an inductive head 2b for recording, it is also possible to provide a construction in which one of these heads is stacked. Further, the protective plate 4, which is provided for the purpose of protecting the head element portion 2, need not be provided in some cases.

Further, in the above embodiment, the substrate 1 is a prism whose section perpendicular to the longitudinal direction thereof is a parallelogram. When the section of the substrate 1 is a parallelogram, the formation described above with reference to the thin film magnetic head production process is straight-forward. However, the present invention is not limited to a parallelogram configuration as long as the difference between the angle made by the plane 1a and the side surface 1b of the substrate 1 and the vertical direction is the azimuth angle θx. That is, the configuration of the section of the plane of the substrate 1 perpendicular to the longitudinal direction may, for example, be triangular or polygonal.

When the double azimuth system is adopted in order to achieve an improvement in recording density and transfer rate, it is necessary to prepare another thin film magnetic head H2 of which the azimuth angle θx is different from that of the magnetic gaps Ga and Gb of the thin film magnetic head H1. In such a case, when performing the cutting with an inclination by a predetermined angle from the boundary of the thin film element Z in the process for producing the above-described thin film magnetic head shown in FIG. 3D, it is possible to change the azimuth angle solely by changing the cutting angle. For example, when a thin film magnetic head H2 is required which has an MR element Ga' and a magnetic gap Gb' of an azimuth angle θy which is of the same size as the azimuth angle θx of the MR element Ga and the magnetic gap Gb, it is possible to obtain it at the cutting position as indicated by the one-dot chain line in FIG. 3D.

A combination head will now be described in which the two thin film magnetic heads H1 and H2, having opposite azimuth angles θx and θy, are mounted to the head mounting surface 5a of a single base 5. As shown in FIG. 4A, when the L-shaped thin film magnetic heads H1 and H2 are arranged in the same orientation, it is also possible to arrange such that the angle (mounting angle) αy made by the side surface 1b of the thin film magnetic head H2 on which the bonding pads 3 are provided and the circuit board 6 is an acute angle (less than 90 degrees). However, in that case, it is difficult to insert the forward end portions of the ball bonding capillaries between the bonding pads 3 and the terminal portions 6a of the circuit board 6 which are close to each other. This phenomenon, which is conspicuous in the case of the combination head shown in FIG. 4A, because the distance from the adjacent thin film magnetic head H1 is small, similarly occurs in the case of a single head in which one thin film magnetic head H2 is arranged on a single base 5. Further, this is not restricted to the case in which the ball bonding method is adopted for the junction of the bonding pads 3 with the terminal portions 6a; it is the same with the case in which the junction is effected by a wire bonding method or the like.

In view of this, more preferably, when mounting the thin film magnetic heads H1 and h2 to the head mounting surface 5a of the base 5, the mounting is effected such that the angles (mounting angles) αx and αy made by the side surface 1b on which the bonding pads 3 are provided and the circuit board 6 are obtuse angles. For example, as shown in FIG. 4B, the arrangement is effected in a condition in which the thin film magnetic head H2 shown in FIG. 4A is turned over, and the side surface 1b of the thin film magnetic head H1 on which the head element portion 2 and the bonding pads 3 are provided is not opposed to the side surface 1b of the thin film magnetic head H2 on which the head element portion 2 and the bonding pads 3 are provided. The azimuth angle θy of the MR element Ga' and the magnetic gap Gb' is the same in the case in which the turning over is effected since the two opposed planes 1a and 4b are parallel. And, when connecting the bonding pads 3 with the terminal portions 6a of the circuit board 6 by ball bonding, it is possible for the forward end portions of the capillaries to be easily inserted from above between the bonding pads 3 and the terminal portions 6a, making it possible to reliably perform the connection.

Or, as shown in FIG. 4C, due to design convenience or the like, also in the case in which it is necessary to perform arrangement such that the side surfaces 1b of the thin film magnetic heads H1 and H2 on which the head element portions 2 and the bonding pads 3 are provided are opposed to each other, the side surfaces 1b are open on top by making the angles (mounting angles) αx and αy made by the side surfaces 1b and the circuit board 6 obtuse angles, so that when connecting the bonding pads 3 with the terminal portions 6a of the circuit board 6 by ball bonding or the like, the forward end portions of the capillaries can be easily inserted from above between the bonding pads 3 and the terminal portions 6a, making it possible to reliably effect the connection.

In accordance with the present invention, there is provided a thin film magnetic head comprising a head element portion stacked on a side surface of a substrate having two opposed planes, two opposed side surfaces intersecting the planes, and a tape slide surface provided at one end portion of the planes and the side surfaces, at least one of a magnetic gap of an induction type magnetic head and a magneto-resistive effect element of a magneto-resistive effect type magnetic head being exposed on the tape slide surface, and a bonding pad connected to the head element portion, wherein an angle made by one of the side surfaces on which the head element portion and the bonding pad are provided and one of the planes constitutes an azimuth angle, whereby it is possible to provide a thin film magnetic head in which the magnetic gap is inclined by a predetermined azimuth angle and in which the predetermined azimuth angle is reproduced accurately and easily.

Further, in the thin film magnetic head of the present invention, the two planes and the two side surfaces of the substrate are respectively parallel to each other, whereby it is possible to easily form a thin film magnetic head in which the magnetic gap is inclined by a predetermined azimuth angle.

Further, in the thin film magnetic head of the present invention, there is provided a protective plate which is attached so as to cover the head element portion and which protects the head element portion, whereby it is possible to prevent the head element portion, which is very thin, from being excessively worn or damaged by the sliding of the magnetic tape.

Further, in accordance with the present invention, there is provided a thin film magnetic head producing method comprising the steps of: stacking on a planar wafer at least one of an induction type magnetic head and a magneto-resistive effect type magnetic head to form a plurality of head element portions, forming a plurality of sets of bonding pads connected to the head element portions, cutting the wafer with magnetic gaps of the head element portions being exposed on a same end surface to form a bar on which a plurality of said head element portions and said bonding pads are arranged side by side, attaching a protective member consisting of a bar-like non-magnetic material so as to stride over and cover the plurality of head element portions of the bar, and integrally cutting the bar and the protective member for each head element portion and each bonding pad to form a substrate and a protective plate with a set of said head element portion existing therebetween, an angle made by the cut surface and the surface on which the head element portion is provided constituting a desired azimuth angle, whereby it is possible to easily form a thin film magnetic head in which the magnetic gap is inclined by a predetermined azimuth angle.

Further, in accordance with the present invention, there is provided a rotary head assembly, wherein one of the planes of the thin film magnetic head is placed so as to be in contact with the upper surface of a base consisting of a plate-like member, and an azimuth angle is determined by one of the side surfaces on which the head element portion and the bonding pad are provided and the upper surface of the base, whereby it is possible to provide a magnetic head in which the magnetic gap is inclined by a predetermined azimuth angle, with the rotary head assembly being mounted to the rotary drum, the predetermined azimuth angle being reproduced accurately and easily.

Further, in accordance with the present invention, there is provided a rotary head assembly in which the rotary head assembly of the present invention is formed by one of the side surfaces on which the head element portion and the bonding pad are provided and the base, wherein the angle of the side on which the head element portion and the bonding pad are provide is an obtuse angle, whereby the junction operation when connecting the bonding pads with the terminal portions by ball bonding or the like is easily conducted, and it is possible to obtain a thin film magnetic head in which the bonding pad and the terminal portions are reliably joined.

Further, in accordance with the present invention, there is provided a rotary head assembly in which two heads are arranged side by side such that one of the planes of the thin film magnetic head is in contact with the upper surface of the base consisting of a plate-like member, wherein the azimuth angle of each of the two thin film magnetic heads is determined by the angle made by one of the side surfaces on which the head element portion and the bonding pad are provided and the upper surface of the base, whereby it is possible to provide a double azimuth type magnetic head in which the magnetic gap is inclined by a predetermined azimuth angle and in which it is possible to reproduce the predetermined azimuth angle accurately and easily.

Further, in accordance with the present invention, there is provided a rotary head assembly in which the head is placed on the base such that one of the side surfaces of one of the thin film magnetic heads on which the head element portion and the bonding pad are provided is not opposed to the side surface of the other thin film magnetic head, whereby a double azimuth type rotary head assembly is provided in which the junction operation is easily conducted when connecting the bonding pads with the terminal portions by ball bonding or the like, making it possible to obtain a thin film magnetic head in which the bonding pads and the terminal portions are reliably connected.

Further, in accordance with the present invention, there is provided a rotary head assembly in which heads are placed on the base such that one of the side surfaces of the one of the thin film magnetic heads on which the head element portion and the bonding pad are provided is opposed to one of the side surfaces of the other thin film magnetic head on which the head element portion and the bonding pad are provided, wherein the angle which is formed by one of the side surfaces on which the head element portion and the bonding pad are provided and the base and which is on the side where the head element portion and the bonding pad are provided is an obtuse angle, whereby it is possible to provide a double azimuth type rotary head assembly in which the junction operation is easily conducted when connecting the bonding pads with the terminal portions, making it possible to obtain a thin film magnetic head in which the bonding pads and the terminal portions are reliably connected.

What is claimed is:

1. A rotary head assembly comprising two thin film magnetic heads each comprising
    a substrate having two opposed planes, opposed first and second side surfaces intersecting the planes, and a tape slide surface provided at an end portion of the two opposed planes and the first and second side surfaces,
    at least one of a magnetic gap and a magneto-resistive effect element on the tape slide surface,
    a head element portion and a bonding pad connected to the head element portion on the first side surface, wherein two thin film magnetic heads are arranged side by side such that one of the two opposed planes of each substrate is in contact with an upper surface of a base consisting of a plate-like member,
    wherein an azimuth angle of each of the two thin film magnetic heads is determined by the angle made by the first side surface and a line perpendicular to the upper surface of the base,
    wherein the two thin film magnetic heads are placed on the base such that the first side surface of each thin film magnetic head is not opposed to the other thin film magnetic head, and
    wherein and the angle which is formed by the first side surface of each thin film magnetic head and the base is an obtuse angle.

2. A rotary head assembly comprising two thin film magnetic heads each comprising
    a substrate having two opposed planes, opposed first and second side surfaces intersecting the planes, and a tape slide surface provided at an end portion of the two opposed planes and the first and second side surfaces,
    at least one of a magnetic gap and a magneto-resistive effect element on the tape slide surface, a head element portion and a bonding pad connected to the head element portion on the first side surface,
    wherein two thin film magnetic heads are arranged side by side such that one of the two opposed planes of each substrate is in contact with an upper surface of a base consisting of a plate-like member,
    wherein an azimuth angle of each of the two thin film magnetic heads is determined by the angle made by the first side surface and a line perpendicular to the upper surface of the base,
    wherein the two thin film magnetic heads are placed on the base such that the first side surface of each thin film magnetic head face each other, and
    wherein the angle which is formed by the first side surface of each thin film magnetic head and the base is an obtuse angle.

3. A magnetic head assembly comprising:
    a base;
    a first magnetic head mounted to the base,
    wherein the first magnetic head has an inclined side surface;
    a second magnetic head having an inclined side surface and mounted to the base, such that the inclined side surface of the second magnetic head and the inclined side surface of the first magnetic head face in opposite directions,
    wherein the inclined surface of each of the first and second magnetic heads forms an azimuth angle with respect to a line perpendicular to the base, and
    wherein the inclinded side surface of the first and second magnetic heads form obtuse angles with respect to the base.

4. A magnetic head assembly comprising:
    a base;
    a first magnetic head mounted to the base,
    wherein the first magnetic head has an inclined side surface, and
    wherein the inclined surface forms an obtuse angle with respect to the base; and
    a second magnetic head having an inclined side surface and mounted to the base, such that the inclined side surface of the second magnetic head faces the inclined side surface of the first magnetic head,
    wherein the inclined surface of the first and second magnetic heads form an azimuth angle with respect to a line perpendicular to the base, and
    wherein the inclined side surfaces of the first and second magnetic heads form obtuse angles with respect to the base.

* * * * *